United States Patent
Podsiadlo et al.

(10) Patent No.: US 10,210,118 B2
(45) Date of Patent: *Feb. 19, 2019

(54) SERIAL-BUS INTERFACE FOR MULTI-DIE MODULE

(71) Applicant: pSemi Corporation, San Diego, CA (US)

(72) Inventors: David Alan Podsiadlo, San Diego, CA (US); Edward Nicholas Comfoltey, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/340,832

(22) Filed: Nov. 1, 2016

(65) Prior Publication Data

US 2018/0121381 A1  May 3, 2018

(51) Int. Cl.
| | | |
|---|---|---|
| *G06F 13/20* | (2006.01) | |
| *H03D 3/24* | (2006.01) | |
| *G06F 13/364* | (2006.01) | |
| *G06F 13/42* | (2006.01) | |
| *G06F 13/40* | (2006.01) | |

(52) U.S. Cl.
CPC .......... *G06F 13/364* (2013.01); *G06F 13/404* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 2005/0268193 A1* | 12/2005 | Waayers | ........ | G01R 31/318555 714/727 |
| 2009/0214205 A1* | 8/2009 | Clark | ........ | H04K 3/42 398/39 |
| 2015/0055720 A1* | 2/2015 | Lin | ........ | G06F 13/128 375/259 |

(Continued)

OTHER PUBLICATIONS

Wilkerson, et al., "A look at the MIPI RFFE standard", Bus Interface, eetasia.com, EE Times-Asia, Mar. 30, 2011, pp. 1-3.

(Continued)

*Primary Examiner* — Hyun Nam
(74) *Attorney, Agent, or Firm* — Jaquez Land Greenhaus LLP; Martin J. Jaquez, Esq.; John Land, Esq.

(57) ABSTRACT

Circuits and methods for efficient interconnect layout of multiple circuit elements, including integrated circuits (ICs), within a circuit module, while enabling only a single control/status (C/S) connection per module. In a first embodiment, the C/S interfaces of multiple ICs are configured in parallel within a multi-IC module, and coupled through a single module serial bus to a system C/S serial bus. In a second embodiment, the C/S interface of a primary IC is coupled through a single module serial bus to a system C/S serial bus, while a secondary IC is internally serially coupled to a "pass through" interface of the primary IC. In a third embodiment, a dynamic address translation circuit translates device and register address information provided by a master device into corresponding internal addresses, and re-directs command messages from a system C/S serial bus to internal slave devices.

4 Claims, 10 Drawing Sheets

Improved Signal Routing Concept

(56) References Cited

U.S. PATENT DOCUMENTS

2015/0349770 A1* 12/2015 Bakalski ................ H04B 1/006
                                                        455/78
2017/0192918 A1*  7/2017 Tenbroek .............. G06F 13/364
2018/0121384 A1   5/2018 Podsiadlo et al.

OTHER PUBLICATIONS

Peregrine Semiconductor Corporation, Peregine MIPI RFFE Interface App Note, Sep. 20, 2010, 8 pgs.
Nam, Hyun, Office Action received from the USPTO dated Apr. 12, 2018 for U.S. Appl. No. 15/340,880, 15 pgs.
Nam, Hyun, Final Office Action received from the USPTO dated Oct. 1, 2018 for U.S. Appl. No. 15/340,880, 11 pgs.
Nam, Hyun, Notice of Allowance received from the USPTO dated Nov. 29, 2018 for U.S. Appl. No. 15/340,880, 9 pgs.

* cited by examiner

Improved Signal Routing Concept

Parallel C/S Connectivity

Serial C/S Connectivity

Dynamic Address Translation

SERIAL-BUS INTERFACE FOR MULTI-DIE MODULE

CROSS-REFERENCE TO RELATED APPLICATION

This application is related to U.S. application Ser. No. 15/340,880 entitled "Serial-Bus Interface for Multi-Die Module" filed on Nov. 1, 2016 and incorporated herein by reference in its entirety.

BACKGROUND

(1) Technical Field

This invention relates to electronic circuits, and more particularly to electronic integrated circuits interconnected by a serial bus.

(2) Background

Modern electronic circuits, particularly radio frequency (RF) electronic circuits, are commonly implemented by interconnecting one or more integrated circuits ("ICs", also known as "dies"), each providing one or more desired functions, such as amplification, modulation/demodulation, tuning, switching, etc. It is also common to embed at least one IC and additional external circuit elements (e.g., filters, tuning elements, etc.) in a circuit module configured to be coupled to other circuit modules and/or additional external circuit elements or system elements (e.g., user controls, antennas, etc.).

In the realm of RF electronics, RF communication systems typically include "RF front-end" (RFFE) circuitry, which is a generic term for all of the circuitry between a radio antenna up to and including the mixer stage of a radio. An industry standard serial bus has been developed by the Mobile Industry Processor Interface (MIPI) Alliance to interconnect sets of circuit modules for RFFE circuitry. In particular, the MIPI RF Front-End (RFFE) Control Interface serial bus has been widely adopted in a variety of RF systems, particularly mobile wireless systems.

The MIPI RFFE serial bus is a serial, two-wire, master/slave interface originally designed for controlling a variety of RF front end devices, such as amplifiers, antenna switches, filters, etc. (since extended for controlling other modules or devices as well). One wire is a bi-directional serial data line (SDATA), and the other wire is a "Bus Master" generated synchronous clock (SCLK). A third wire, VIO, may be used as a voltage reference/supply, to control power consumption, and to provide reset and enable functions for the MIPI RFFE serial bus.

FIG. 1 is a block diagram of a generic circuit module 100. Included within the example circuit module 100 is an IC 102 for receiving an input signal, SigIN in this case. Coupled to the IC 102 is a set of additional external circuit elements 104 (shown as filters in this example) for processing some portion of the SigIN signal received from the IC 102, and returning the processed signal back to the IC 102 for additional processing. The IC 102 provides an output signal (SigOUT in this case) for the final processed signal. The IC 102 is coupled through a control and status (C/S) interface to a control/status serial bus 106, which may be a MIPI RFFE serial bus. As one example, the circuit module 100 may receive an SigIN signal, modulate the signal within the IC 102 onto a selected frequency band, filter the modulated signal through one of the external circuit elements 104, and then impedance match the filtered modulated signal to generate a matched, filtered, modulated signal at SigOUT.

In the illustrated example, interconnecting various elements within the circuit module 100 can lead to tortuous routing of signal lines, as illustrated by the signal lines from the external circuit elements 104 back to the IC 102, which are curved, have different lengths, and have different inter-line spacing, all of which can be problematic when routing high frequency signals (e.g., RF signals at or above about 100 MHz), especially when considering isolation concerns.

Accordingly, there is a need for providing improved and efficient interconnect layouts for circuit elements within a circuit module, particularly an RF circuit module. The present invention meets this and other needs.

SUMMARY OF THE INVENTION

The present invention encompasses circuits and methods for providing improved and efficient interconnect layouts for circuit elements, including integrated circuits (ICs), within a circuit module, particularly a radio frequency (RF) circuit module. The present invention also encompasses circuits and methods for providing serial bus control and status (C/S) connectivity to multi-IC modules without requiring multiple C/S connections per module, thus enabling partitioning of functionality across multiple ICs within a circuit module to enable efficient interconnect layout between such ICs.

In a first embodiment, the C/S interfaces of multiple ICs are configured in parallel within a multi-IC module, and coupled through a single module serial bus to a control/status serial bus (which may be a MIPI RFFE serial bus). In addition, the multiple ICs are configured internally with the same unique address (a "unique slave identifier," or USID), and thus respond to the same slave address. Thus, from the point of view of a master device on the control/status serial bus, the multi-IC module appears to be a single addressable slave device. One IC is designated as the "primary device" within the multi-IC module to drive the control/status serial bus with Status information; any additional IC is designated as a "secondary device" and is specially configured to be "Register Read disabled", thus responding only to Control information directed to registers within its register address space, and giving no response to requests for Status information directed to registers within its register address space.

In a second embodiment, the C/S interface of a primary IC is coupled through a single module serial bus to a control/status serial bus (which may be a MIPI RFFE serial bus). A secondary IC is internally serially coupled to a "pass-through" interface of the primary IC; additional secondary ICs may be coupled to the "pass-through" interface of the primary IC over a serial bus, or "daisy chained" to each other in a like fashion (i.e., each secondary IC having a C/S interface as well as a "pass-through" interface). All of the ICs are configured internally with the same USID, and thus respond to the same slave address. Accordingly, from the point of view of a master device on the control/status serial bus, the multi-IC module appears to be a single addressable slave device. Secondary devices may be specially configured to be "Register Read disabled" and thus not respond to a request for Status information (i.e., the secondary devices are "silent"). However, there is no requirement for secondary devices to be "silent", as the primary device can be configured to prevent bus contention on the control/status serial bus, since all C/S information for the secondary device passes through the primary device.

In a third embodiment, a dynamic address translation (DAT) architecture provides a way to create a multi-die module that at most incurs modification of the primary IC, leaving secondary ICs alone; in some embodiments, even the primary IC need not be changed. A DAT circuit includes a C/S interface that is coupled through a single module serial bus to a control/status serial bus (which may be a MIPI RFFE serial bus). Again, from the point of view of a master device on the control/status serial bus, the multi-IC module appears to be a single addressable slave device. The function of the DAT circuit is to translate or map Device Address and Register Address information provided to the multi-IC module by a master device into corresponding internal addresses, and re-direct command messages to internal slave devices (primary and/or secondary) based on such translated internal addresses. The translation may be done, for example, by combinatorial logic and/or a look-up table. Such translation is possible because, due to the internal partitioning of functions within the multi-IC module, the internal slave devices can be assigned unique sets of Register Addresses.

While embodiments of the invention are described at times in the context of RF ICs, the teachings of the invention apply to electronic circuits used for processing other frequency ranges.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

The present invention encompasses circuits and methods for providing improved and efficient interconnect layouts for circuit elements, including integrated circuits (ICs), within a circuit module, particularly a radio frequency (RF) circuit module. The present invention also encompasses circuits and methods for providing serial bus control and status (C/S) connectivity to multi-IC modules without requiring multiple C/S connections per module, thus enabling partitioning of functionality across multiple ICs within a circuit module to enable efficient interconnect layout between such ICs.

While embodiments of the invention are described at times in the context of radio frequency (RF) ICs, the teachings of the invention apply to electronic circuits used for processing other frequency ranges.

Conceptual Solution to Intra-Module Routing of Signal Lines

Figure 1:
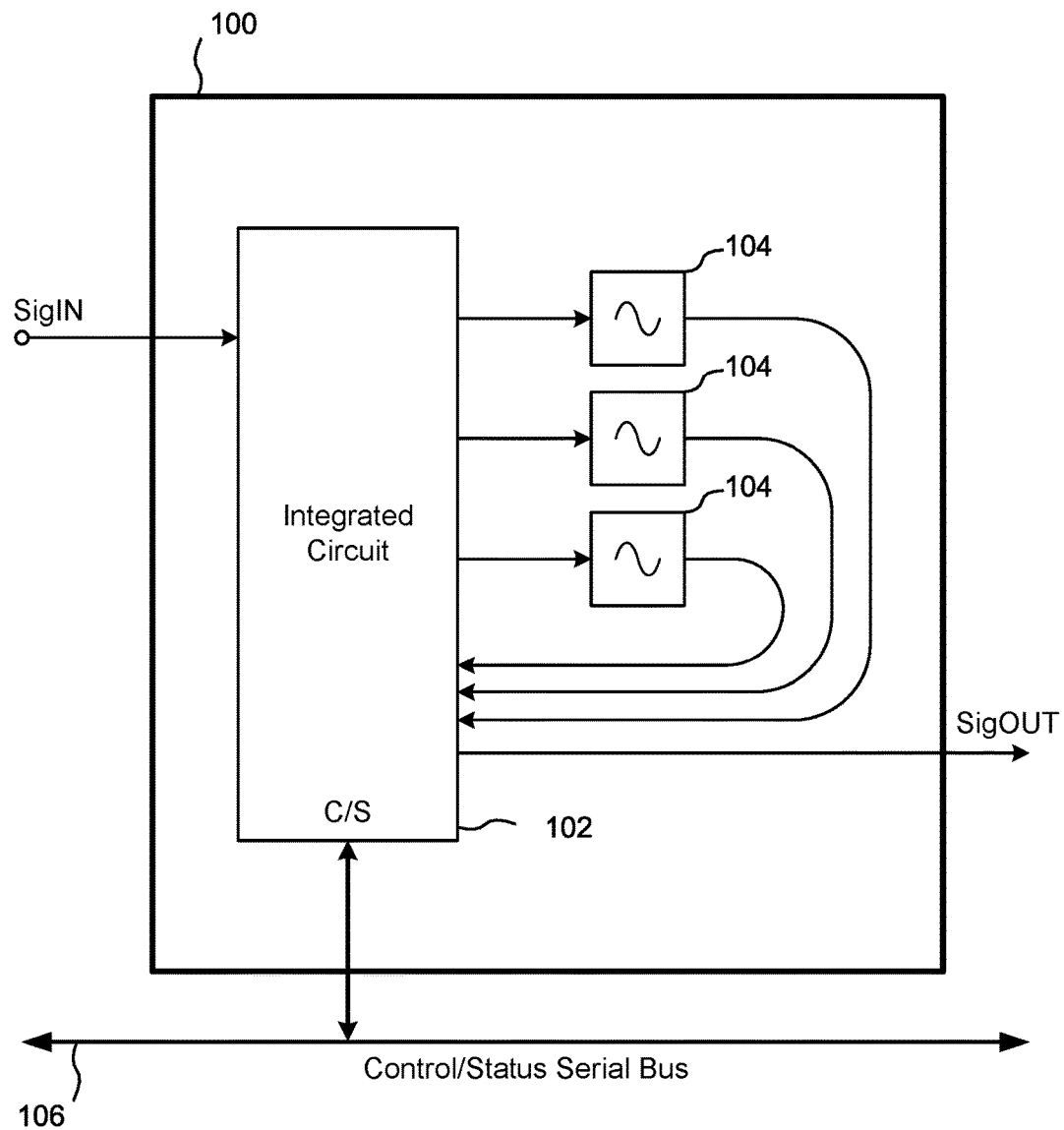
FIG. 1 is a block diagram of a generic circuit module.
Figure 2:
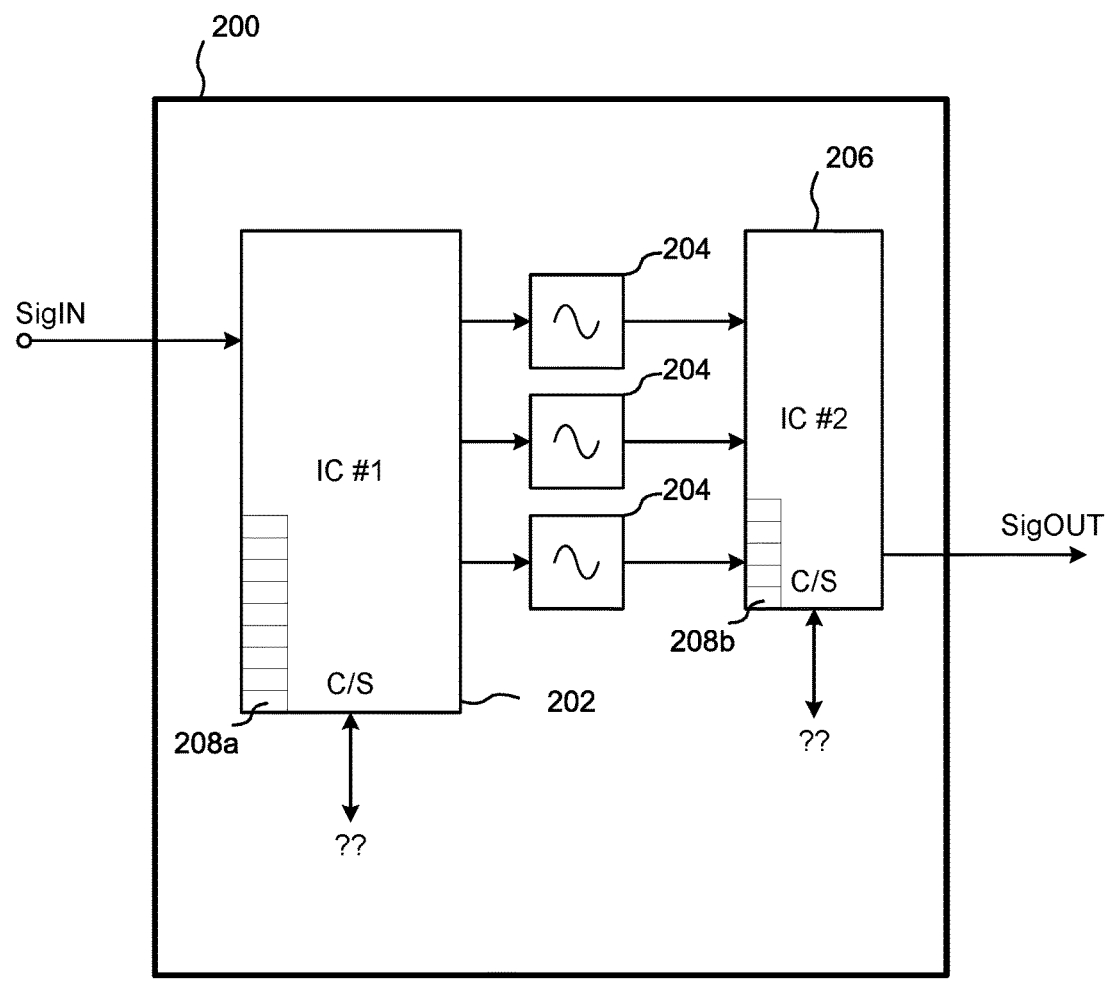
FIG. 2 is a block diagram of a conceptual RF circuit module having RF functionality partitioned between two RF integrated circuits and having improved signal interconnect routing.

One solution to the prior art problem of tortious interconnect layouts for circuit elements within a circuit module is to partition the functions of the IC 102 between two or more ICs which can be positioned within a circuit module so as to allow straightforward routing of signal lines. For example, FIG. 2 is a block diagram of a conceptual RF circuit module 200 having RF functionality partitioned between two RF integrated circuits 202, 206 and having improved signal interconnect routing. More specifically, included within the example RF circuit module 200 is a first IC 202 for receiving an RF input signal, SigIN. Coupled to the first IC 202 is a set of additional external circuit elements 204 (again shown as filters in this example) for processing some portion of the SigIN signal processed by and received from the first IC 202. The output of the external circuit elements 204 is coupled to a second IC 206 for additional processing. The second IC 206 provides an output signal, SigOUT, of the final processed RF signal. (As should be clear, the RF circuit module 200 may include more than two ICs). The first IC 202 and the second IC 206 include internal sets of corresponding read/write control registers 208a, 208b, internally coupled to a corresponding control/status (C/S) interface. The partitioning of functionality within the RF circuit module 200 allows straight, short routes for RF signal lines between module elements.

Partitioning ICs within a module as shown in FIG. 2 to provide improved RF signal interconnect routing creates a new problem: how to couple a control/status serial bus to the added IC or ICs through their respective C/S interfaces. System manufacturers, who may acquire modules from a number of vendors, prefer a single C/S connection per module. Simply putting X number of ICs in one module reduces the physical number of devices from X to one, but the logical number of devices is still X. Thus, partitioning ICs within a single module (without more) would require multiple C/S connection per module. Further, in many cases, a serial bus only supports a limited number of logical slave modules and devices, and simple partitioning would require one or more extra C/S connections per module. For example, the MIPI RFFE serial bus only supports 15 logical slave modules; adding a module with multiple C/S connection per module would adversely impact system designs already utilizing all 15 C/S connections of the MIPI RFFE serial bus. Accordingly, adding one or more control/status bus connections per module is undesirable at the system level. Thus, there is a need for providing serial bus C/S connectivity to multi-IC modules without requiring multiple C/S connections per module, thereby preserving the single C/S connection per module preferred by system manufacturers but enabling partitioning of functionality across multiple ICS to enable efficient interconnect layout between such ICs.

C/S Serial Bus Characteristics

A fuller understanding of the functionality of a serial bus will make the various embodiments of the invention easier to understand. While some of the embodiments described below use the MIPI RFFE Control Interface serial bus as an example of a serial bus, the invention is not limited to that particular serial bus. Accordingly, embodiments of the invention may be used with other serial buses, such as the Serial Peripheral Interface (SPI), I2C, I2S, SMBus, and/or PMBus.

Taking a particular implementation of the MIPI RFFE serial bus as one example, there are two signaling lines on the MIPI RFFE serial bus, SCLK and SDATA. The maximum trace length for SCLK and SDATA is about 15 cm, and the maximum number of slave devices on the serial bus is 15. The SCLK signal line provides a clock signal that is always driven by the master device on the serial bus, at a maximum clock rate of about 26 MHz (for MIPI RFFE 1.0) or 52 MHz (for MIPI RFFE 2.0). There is always a master device, and up to 15 slave devices, each coupled to the SCLK and SDATA signal lines through a respective control and status (C/S) interface. In general, slave devices may support several operating modes (e.g., "startup", "active state", "shutdown", "low-power mode", etc.) and device-specific functions (e.g., operating parameters for amplifiers, switches, programmable tuning and/or filter components, etc.), which are selected by issuing command messages through the bit-serial SDATA signal line under the control of the SCLK signal line.

The SDATA signal line is driven high by the master while the SCLK signal line remains low to initiate a transfer; this is called the Sequence Start Condition or SSC. The SDATA signal line is driven high for the period of one clock cycle and then low for one clock period while the SCLK signal line is low. After an SSC event occurs, the SCLK and SDATA signal lines are driven by the master device to transfer a 12-bit command frame (plus 1-bit odd parity).

The 12-bit command frame consists of two parts, a 4-bit slave Device Address and an 8-bit operational command. The first 4 bits of the command frame are a slave address, SA[3:0], corresponding to a unique slave identifier (USID). If SA[3:0] are all zeroes, then the command is broadcast to and acted upon by all slave devices. Commands that all devices must respond to may include, for example, commands to "go to low power mode" or "reset to a known state". The next 8 bits of the command frame, C[8:0], are the operational command, comprising a 3-bit command type and a 5-bit Register Address, A[4:0]. A slave device having a USID that matches SA[3:0] decodes the operational command to determine the type of command and a designated Register Address within the slave device.

In some implementations of the MIPI RFFE serial bus, only two command types are supported: Register Read (for reading status information from a slave device) and Register Write (for providing control information to a slave device). The command types may be respectively indicated by a code in the first 3 bits of the 8-bit operational command (e.g., Read=binary "011", Write=binary "010"). The last 5 bits of the 8-bit operational command designate a Register Address, A[4:0], within the slave device; accordingly, each slave device can support up to 32 registers using the Register Write and Register Read commands (in some embodiments of slave devices, only a subset of the addressable register space is supported).

If a command indicates a Register Write command type, then the command frame is followed by a Write Data frame driven by the master device. A single Write Data frame may contain from a few bits of payload data up to multiple (e.g., 16) bytes of payload data. Multiple Write Data frames may be transmitted in sequence to an addressed slave device. An addressed slave device will store received payload data in an addressed register, and respond as appropriate to the function of the slave device.

If a command indicates a Register Read command type, then the command frame is followed by a "bus park" cycle, followed by a Read Data frame driven by the addressed slave device. If a Register Read command addresses a register not supported by the addressed slave device, then the addressed slave generates a "no response" frame in reply to the command frame (e.g., a frame of all zeroes with incorrect parity, for some implementations of the MIPI RFFE serial bus).

Other serial bus standards typically have comparable command frame structures and command types. As should be clear from the entirety of this disclosure, the example given above of the MIPI RFFE bus is but one of many possible serial buses (at various clock rates) that may advantageously utilize the inventive concepts of this disclosure.

With such a serial control and status (C/S) bus architecture and operation in mind, embodiments of the invention include single-address multi-IC module slave devices having an internally parallel C/S configuration, or an internally serial C/S configuration, or a dynamic address translation C/S configuration.

Parallel C/S Embodiment

Figure 3:
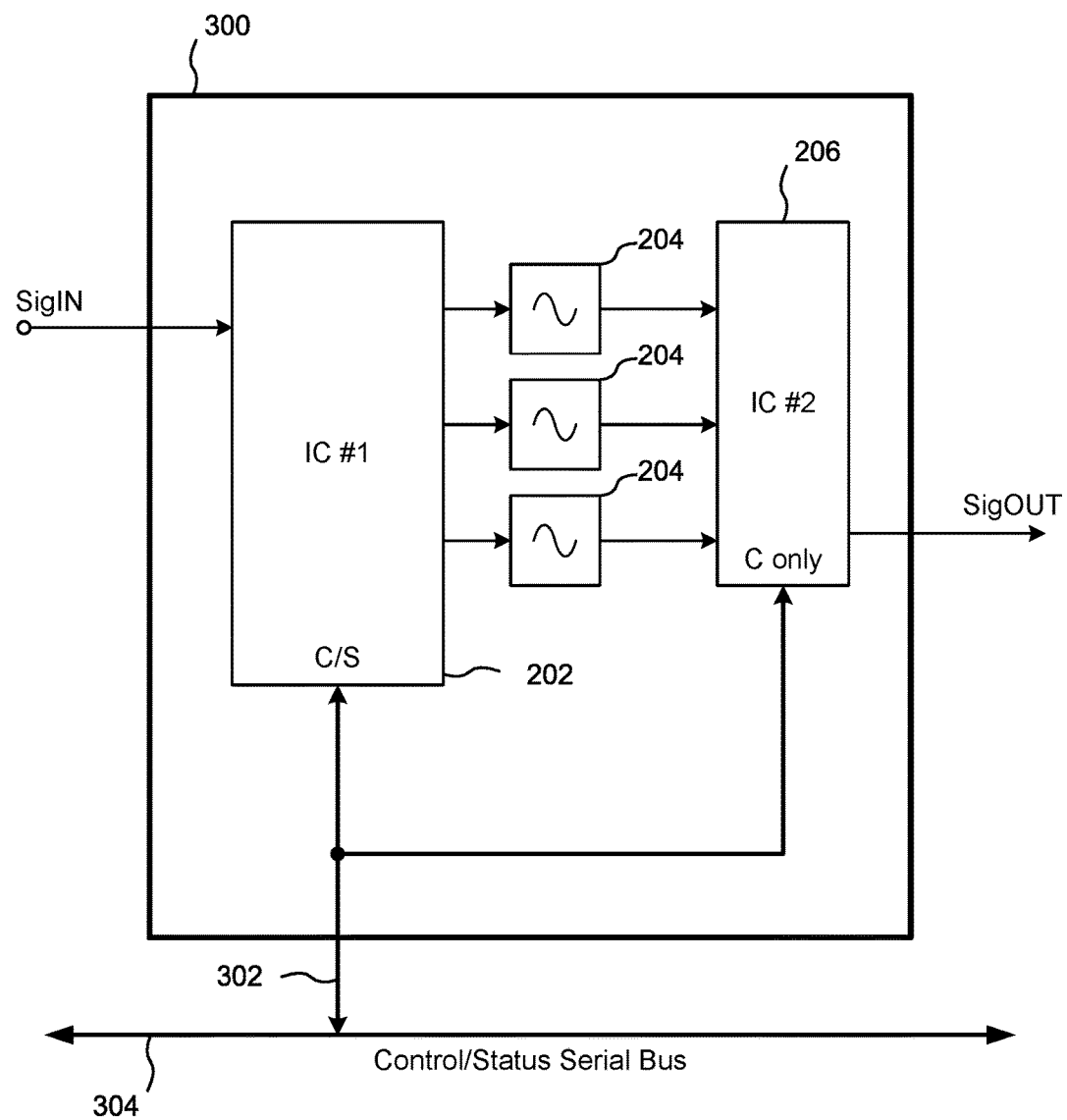
FIG. 3 is a block diagram of an internally parallel C/S embodiment of a multi-IC module with improved signal routing.

FIG. 3 is a block diagram of an internally parallel C/S embodiment of a multi-IC module 300 with improved signal routing. Except as described below, the layout of components within the module 300 is as shown in FIG. 2, and accordingly the reference numbers of such elements remains the same. Internal read/write registers have been omitted for clarity.

In the illustrated embodiment, the control and status (C/S) interface of both the first IC 202 and the second IC 206 are configured in parallel within the multi-IC module 300, and coupled through a single module serial bus 302 to a control/status serial bus 304 (which may be a MIPI RFFE serial bus, as described above). In addition, both the first and second ICs 202, 206 are configured internally with the same USID, and they both respond to the same slave address (e.g., SA[3:0]). Thus, from the point of view of a master device on the control/status serial bus 304, the multi-IC module 300 appears to be a single addressable slave device.

Because there are multiple physical devices within the multi-IC module 300, the register address space of the first and second ICs 202, 206 is allocated between them. For example, for a 5-bit Register Address (e.g., A[4:0]), the first IC 202 may have registers at Register Addresses 0, 1, and 2, while the second IC 206 may have registers at Register Addresses 4 and 5. Thus, the first and second ICs 202, 206 will only respond to a Register Write command type that addresses a register within such ICs corresponding Register Address space.

Without more, the internally parallel architecture may be problematic, in that if both the first IC 202 and the second IC 206 try to drive the control/status serial bus 304 simultaneously (e.g., in response to a broadcast command type), there would be a bus conflict which would degrade performance of the system, stress the parts, and potentially lead to premature failure. The solution provided by this embodiment of the invention is to designate only one IC (the "primary device") within the multi-IC module 300 to drive the control/status serial bus 304 with Status information; any additional IC (a "secondary device") is specially configured to be "Register Read disabled" (i.e., "silent"). For example, the first IC 202 may be the primary device, and would respond to Register Read commands directed to registers within its register address space. That would make the second IC 206 a secondary device, which accordingly would have to be configured to respond only to Control information (e.g., Register Write commands) directed to registers within its register address space, and give no response to requests for Status information (e.g., Register Read commands) directed to registers within its register address space. Note that either of the first IC 202 or the second IC 206 may be the primary device, with the other being a secondary device, and that there may be multiple secondary devices.

The interface of the secondary device to the control/status serial bus 304 in such an embodiment must be specially configured to receive only Control information, and be silent with respect to Status requests from the control/status serial bus 304. Essentially, this means deactivating, subverting, or omitting the circuitry that would normally be responsible for responding to a request for Status information (e.g., a Register Read command); FIG. 3 thus shows that the second IC 206 has a "C only" interface (note that this does not mean that Status requests are not coupled, only that no Status information is provided in response to such requests). Such configuration may be done at the time of manufacture through changes to the IC mask or by tying selected input/output pads to a selected potential (e.g., circuit ground or the circuit voltage supply). Alternatively, such configuration may be done after manufacture, such as by "blowing" fusible links or making/breaking connections to external module input/output pads or pins in order to applying a selected potential to one or more enabling circuits. For secondary (slave) devices that do not need to support all commands, and thus have a reduced function I/O, omitting the pertinent circuitry that would normally be responsible for responding to a request for Status information will generally result in a smaller (and thus less expensive to manufacture) device.

The C/S interface of the primary device in such an embodiment may be configured in the "standard" way for a vendor, meaning that no special configuration is necessary. This is an advantage, in that the primary device can be used in both a single-IC module and a multi-IC module without special configuration. Alternatively, the primary device may be specially configured to keep track of its own Status information and any Status information common to the primary and secondary devices. This leads to some duplicate circuitry (particularly for "shadow" write/read control registers) in the primary device so that it can replicate the corresponding circuitry in the secondary device, but allows the primary device to provide a valid response to status requests from the master device by "mimicking" a response on behalf of the secondary device (in other words, no status information is actually provided by the secondary device, but the primary device fictionalizes or "spoofs" such data so that a response valid in form is provided to the master device). For example, if the master device requests status information from a register within the register address space of the second IC 206, the first IC 206, configured with duplicate shadow registers covering the address space of the second IC 206, would respond instead, thus satisfying the master device. As with secondary devices, special configuration of a primary device may be made at the time of manufacture or after manufacture.

Serial Embodiment

Figure 4:
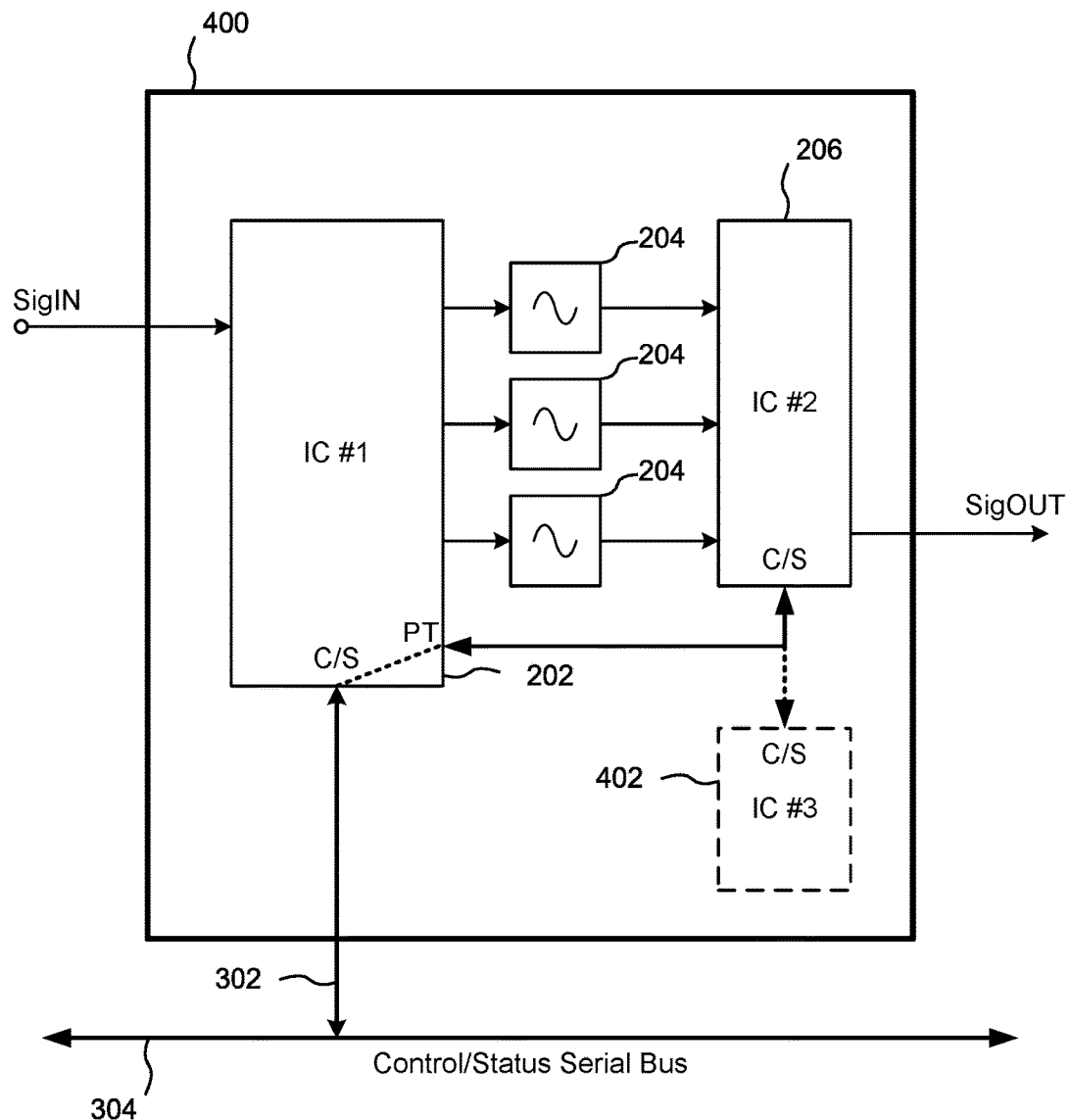
FIG. 4 is a block diagram of an internally serial C/S embodiment of a multi-IC module with improved signal routing.

FIG. 4 is a block diagram of an internally serial C/S embodiment of a multi-IC module 400 with improved signal routing. Except as described below, the layout of components within the module 400 is as shown in FIG. 2, and accordingly the reference numbers of such elements remains the same. Internal read/write registers have been omitted for clarity.

In the illustrated embodiment, the C/S interface of the first IC 202 is coupled through a single module serial bus 302 to a control/status serial bus 304 (which may be a MIPI RFFE serial bus), as in FIG. 3. In contrast to FIG. 3, the second IC 206 is internally serially coupled to a "pass-through" (PT) interface of the first IC 202, which is essentially internally coupled to the corresponding C/S interface of the first IC 202, as indicated by the dotted line (some buffer circuitry may be interposed between the two interfaces if needed). Both the first and second ICs 202, 206 are configured internally with the same USID, and thus both respond to the same slave address (e.g., SA[3:0]).

Additional secondary ICs may be coupled to the PT interface of the first IC 202 over a serial bus (as indicated by a third IC 402 shown in dashed outline), or alternatively "daisy chained" to each other (i.e., each secondary IC having a C/S interface as well as a "pass-through" interface like the first IC 202). Accordingly, from the point of view of a master device on the control/status serial bus 304, the multi-IC module 400 appears to be a single addressable slave device.

In the illustrated example, the primary device (the first IC 202 in this case) receives C/S signals over the single module serial bus 302 from the control/status serial bus 304, and buffers and re-transmits such C/S signals through its pass-through interface to the secondary device (the second IC 206 in this case). Because there are again multiple physical devices, the register address space of the first and second ICs 202, 206 is split between them, as with the parallel architecture in FIG. 3. As in the parallel architecture, only the primary device provides Status information to the control/status serial bus 304.

For some serial bus standards (e.g., the MIPI RFFE bus), a secondary device may be specially configured, as described above for the parallel architecture shown in FIG. 3, to deactivate, subvert, or omit the circuitry that would normally be responsible for responding to a request for Status information. However, there is no requirement for a secondary device to be "silent", as the primary device can be configured for such a bus standard to prevent bus contention on the control/status serial bus 304, since all C/S information for a secondary device passes through the primary device. Accordingly, the primary device can either block status requests from being passed-through to a secondary device, or block responses by a secondary device from being passed-through to the master device.

In the internally serial configuration of FIG. 4, in order to avoid timing issues that may be caused by the buffering of C/S signals to and from a secondary device, the primary device may be specially configured to keep track of its own Status, the Status of a secondary device, and any common Status information. Again, such a configuration requires duplicate "shadow" register circuitry in the primary device. If timely Status information is not available from a secondary device, the primary device may fictionalize or "spoof" such data so that a response valid in form is provided to the master device. As described above, special configuration of a primary device may be made at the time of manufacture or after manufacture.

Alternatively, for some serial bus standards, the primary device may be fast enough, or the serial bus standard slow enough or compatible with some delay in responses, that the primary device can pass through responses from a secondary device to the master device without having to fictionalize or "spoof" response data.

An advantage of the internally serial architecture is that secondary devices do not require any redesign to disable the circuitry that would normally be responsible for responding to a request for Status information. Thus, such ICs can be repurposed, such as being the only IC in another module. Another advantage of the internally serial architecture is that the loading on the control/status serial bus 304 is limited to the loading characteristics (e.g., input capacitance, leakage, speed impact) from a single IC, since only the primary device is coupled to the single module serial bus 302. Thus, adding more than one secondary device will not change the loading presented to the system.

Dynamic Address Translation Embodiment—Overview

With the internally parallel or internally serial architectures described above, one or both ICs in a multi-die module may need to be changed (i.e., re-designed and re-manufactured) for the module to behave as a single logical device. In a third embodiment of the invention, a dynamic address translation architecture provides a way to create a multi-die module that at most incurs modification of the primary IC, leaving secondary ICs alone; in some embodiments, even the primary IC need not be changed.

Figure 5:
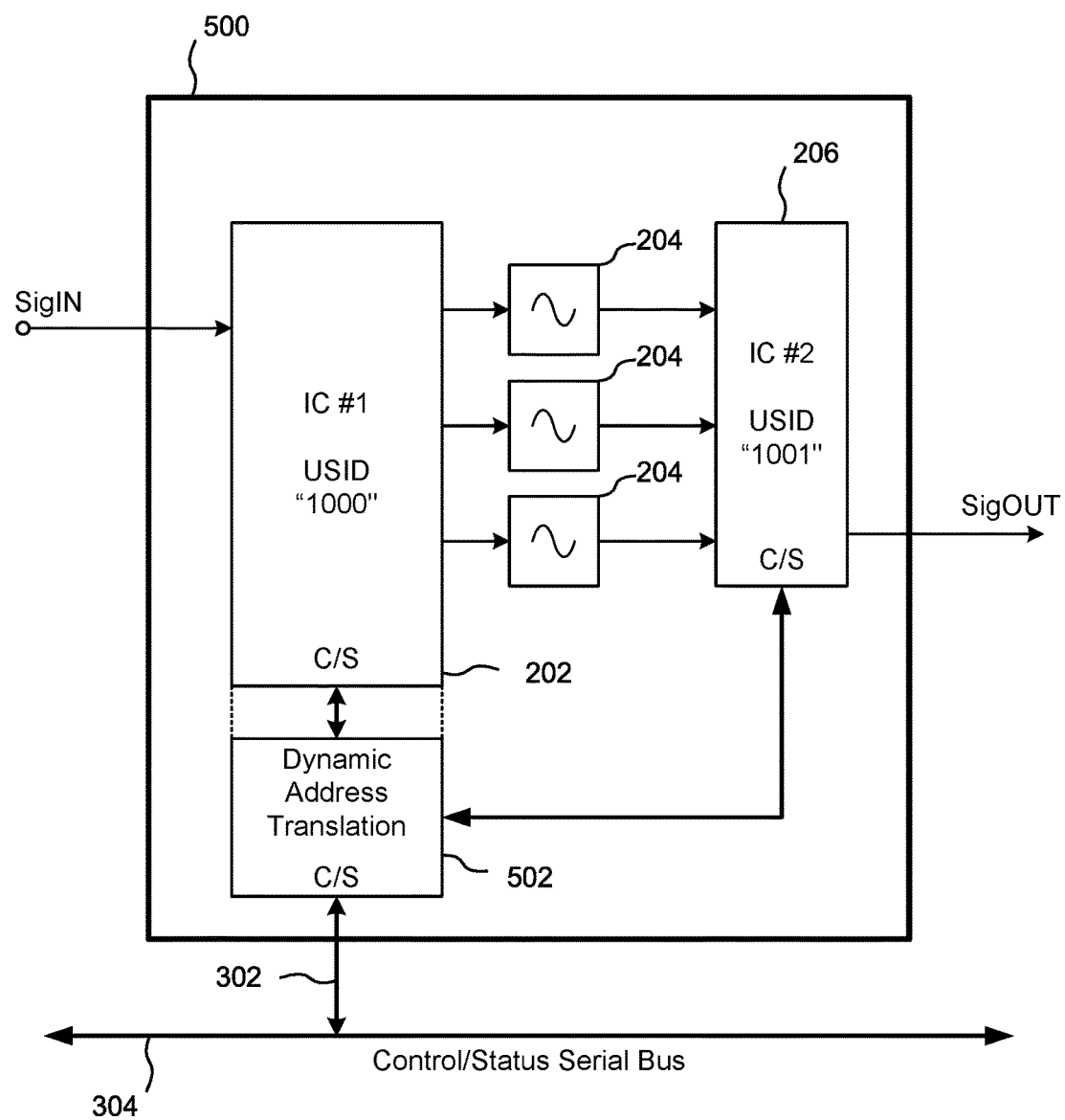
FIG. 5 is a block diagram of a dynamic address translation C/S embodiment of a multi-IC module with improved signal routing.

FIG. 5 is a block diagram of a dynamic address translation C/S embodiment of a multi-IC module 500 with improved signal routing. Except as described below, the layout of components within the module 500 is as shown in FIG. 2, and accordingly the reference numbers of such elements remains the same. Internal read/write registers have been omitted for clarity.

Added to the multi-IC module 500 is a dynamic address translation (DAT) circuit 502. The DAT circuit 502 includes a C/S interface that is coupled through a single module serial bus 302 to a control/status serial bus 304 (which may be a MIPI RFFE serial bus), as in FIG. 3. Again, from the point of view of a master device on the control/status serial bus 304, the multi-IC module 500 appears to be a single addressable slave device.

If more than two IC devices are included in the multi-IC module 500, or if there is a desire to use only unmodified ICs as IC devices, then it may be more economical or convenient to fabricate the DAT circuit 502 as a separate IC within the multi-IC module 500, in which case the DAT circuit 502 IC is the primary device in the multi-IC module 500 and all other ICs within the multi-IC module 500 are secondary devices. However, in many cases, it may be more economical to incorporate the functionality of the DAT circuit 502 as a subcircuit within another IC (e.g., the first IC 202, as suggested by the dotted connecting lines in FIG. 5), in which case that IC is the primary device in the multi-IC module 500.

The function of the DAT circuit 502 is to translate or map Device Address and Register Address information provided to the multi-IC module 500 by a master device into corresponding internal addresses, and re-direct command messages to internal slave devices (primary and/or secondary) based on such translated internal addresses. The translation may be done, for example, by combinatorial logic and/or a look-up table (e.g., implemented in a read-only memory circuit). Such translation is possible because, due to the internal partitioning of functions within the multi-IC module 500, the internal slave devices can be assigned unique sets of Register Addresses. Accordingly, a specific Device Address and Register Address from a master device can be translated (mapped) to a unique Device Address and Register Address of an IC within the multi-IC module 500.

As in the Serial Embodiment of FIG. 4, for some serial bus standards, a secondary device may be specially configured to deactivate, subvert, or omit the circuitry that would normally be responsible for responding to a request for Status information. However, there is no requirement for a secondary device to be "silent", as the DAT circuit 502 can be configured for such a bus standard to prevent bus contention on the control/status serial bus 304, since all C/S information for a secondary device passes through the DAT circuit 502. Accordingly, the DAT circuit 502 can either block status requests from being passed-through to a secondary device, or block responses by a secondary device from being passed-through to the master device. In addition, in order to avoid timing issues that may be caused by the buffering of C/S signals to and from a secondary device, the DAT circuit 502 may be specially configured to keep track of its own Status (as essentially a primary device), the Status of each secondary device, and any common Status information. Again, such a configuration requires duplicate "shadow" register circuitry in the DAT circuit 502. If timely Status information is not available from a secondary device, the DAT circuit 502 may fictionalize or "spoof" such data so that a response valid in form is provided to the master device. As described above, special configuration of a primary device may be made at the time of manufacture or after manufacture. Alternatively, for some serial bus standards, the DAT circuit 502 may be fast enough, or the serial bus standard slow enough or compatible with some delay in responses, that the DAT circuit 502 can pass through responses from a secondary device to the master device without having to fictionalize or "spoof" response data.

DAT Embodiment—Example of Address Mapping

Referring to FIG. 5, the DAT circuit 502 may be assigned an internal Device Address (i.e., a USID) of "0001", which is the Device Address used by the master device to address the multi-IC module 500 as a unit. The first IC 202 may be assigned an internal Device Address of "1000", while the second IC 206 may be assigned an internal Device Address of "1001" (alternatively, the Device Address of the first IC 202 may be the same as the Device Address of the DAT circuit 502). TABLE 1 below shows two examples of 12-bit commands frames issued by the master device over the control/status serial bus 304, and coupled to the DAT circuit 502 through the single serial module bus 302.

TABLE 1

| Example # | Command Frame | Meaning | DAT Mapping |
|---|---|---|---|
| 1 | 0001:010:00000 | For Device #1, Write to Register #0 | 1000:010:00000 |
| 2 | 0001:010:01111 | For Device #1, Write to Register #15 | 1001:010:01111 |

In the first example, the command frame from the master device is directed to device "0001", specifies a "Register Write" command "010", and specifies the first register in that device, having Register Address "00000". The DAT circuit 502, having a USID of "0001", will respond to the command frame. Using a lookup table or other mapping circuitry, the command frame (and subsequent associated Write Data frames) is translated and internally directed by the DAT circuit 502 to the first IC 202, which was assigned the internal Device Address of "1000" and is the only internal device in the multi-IC module 500 having a register with an address of "00000".

In the second example, the command frame from the master device is again directed to device "0001", specifies a "Register Write" command "010", and specifies the 15$^{th}$ register in that device, having Register Address "01111". Again, the DAT circuit 502, having a USID of "0001", will respond to the command frame. Using a lookup table or other mapping circuitry, the command frame (and subsequent associated Write Data frames) is translated and internally directed by the DAT circuit 502, this time to the second IC 206, which was assigned the internal Device Address of "1001" and is the only internal device in the multi-IC module 500 having a register with an address of "01111".

In an alternative configuration, the DAT circuit 502 can re-map Register Addresses as well. For example, the command frame in the second example of TABLE 2 below could be mapped not only to the second IC 206 (internal Device Address of "1001"), but to a different Register Address, such as to register "00000" rather than to register "01111". Because both the Device Address and the Register Address are used for such mapping, there is no ambiguity despite the possibility that another IC device (internal Device Address of "1000") in the multi-IC module 500 also has a register with the address of "00000".

TABLE 2

| Example # | Command Frame | Meaning | DAT Mapping |
|---|---|---|---|
| 1 | 0001:010:00000 | For Device #1, Write to Register #0 | 1000:010:00000 |
| 2 | 0001:010:01111 | For Device #1, Write to Register #15 | 1001:010:00000 (remapped register) |

Note that it is convenient to use consecutive Register Address ranges for each of the first and second ICs 202, 206, but not necessary in light of the ability of the DAT circuit 502 to re-map addresses.

DAT Embodiment—Real-Time Operation

Due to the fact that many control systems (including RF front end control systems) may require a real-time response to command frames, Device Address and Register Address translation is not always a simple task. For example, to meet a real-time requirement for the MIPI RFFE serial bus, the DAT architectures described above can be configured to operate in a mode that utilizes the bit-sequential characteristic of serial data transfer and the capability of the control/status serial bus to abort a command. Common control/status serial buses (such as the MIPI RFFE serial bus) have a variety of ways of aborting a command, including inducing a parity error, sending a negative acknowledgement, stopping the system clock (e.g., SCLK), or sending a "STOP" condition or a new "START" condition before the current command has completed.

Referring to FIG. 5, the DAT circuit 502 (again, which may be integrated within the first IC 202 acting as the primary device for the multi-IC module 500) may receive a command frame over the control/status serial bus 304 from the bus master. As described above, the command frame comprises a sequence of bits. In most cases, those bits only have meaning when a set of bits has been accumulated and decoded. Thus, for example, a 4-bit slave Device Address requires accumulation of 4 sequentially received bits from a command frame before decoding circuitry can determine which slave device is being addressed.

Using this characteristic, in the DAT real-time mode, the DAT circuit 502 may be configured to always map the Device Address and Register Address bits from a received non-broadcast command frame to internal Device Address and Register Address bits and transmit the mapped bits to every internal slave device (primary or secondary) coupled to the DAT circuit 502 for which a real-time response is desired, as a form of "look ahead" transmission. (Note that in some serial protocols, there are special situations—for example, for broadcast commands—where all slave devices receive an un-mapped Device Address and/or Register Address).

At the point where the DAT circuit 502 can definitively determine that a non-broadcast command frame is not intended for a particular internal device, then the DAT circuit 502 will commence a process to abort the command being re-transmitted to that device. Conversely, if the DAT circuit 502 definitively determines that a non-broadcast command frame is intended for a particularly internal device, then that device has already received at least a mapped Device Address and is prepared to receive any remaining Register Address bits not already received. Thus, the DAT circuit 502 need not wait to receive all of the bits of a Device Address and a Register Address from a master device and only then commence mapping to the proper internal slave device. TABLE 3 sets forth several examples of the operation of the DAT circuit 502 for both non-broadcast and broadcast command frames:

TABLE 3

| Example # | Command Frame | Meaning | Real-Time DAT Mapping to 1$^{st}$ & 2$^{nd}$ Internal ICs |
|---|---|---|---|
| 1 | 0001:010:00000 | For Device #1, Write to Register #0 | 1000:010:00000 1001:010:0{abort} |
| 2 | 0001:010:01111 | For Device #1, Write to Register #15 | 1000:010:0{abort} 1001:010:01111 |
| 3 | 0011:010:00000 | For Device #3, Write to Register #0 | 00{abort} 00{abort} |
| 4 | 0001:010:01000 | For Device #1, Write to Register #8 | 1000:010:0{abort} 1001:010:01{abort} |
| 5 | 0000:010:00011 | Broadcast to all Devices, Write to Register #3 | 0000:010:00011 0000:010:00011 |
| 6 | 0001:010:00100 | For Device #1, Write to Register #4 | 1000:010:00100 1001:010:00100 |

Note that in TABLE 3, the "{abort}" instances shown are when the DAT circuit 502 detects that a command needs to be aborted and commences an abort process compatible with the serial bus standard in use. The actual completion of the abort process may take some time after the commencement of the abort process. Accordingly, it should be understood that "aborting a command" encompasses "commencing a process to about a command". For example, the DAT circuit 502 may set a flag as an indicator to other circuitry to abort a particular command to a device. The actual implementation, signaling, and timing of the process required to abort a command may vary depending on the specific serial Command/Status protocol in use.

Using the first example from TABLE 3, and assuming that the first IC 202 (USID="1000") only has a single register (address="00000") and that the second IC 206 (USID="1001") also only has a single register (address="01111"), if the command frame received by the DAT circuit 502 is "0001:010:00000", the DAT circuit 502 will map and re-transmit the received bits of that command frame to the first IC 202 as "1000:010:00000" and concurrently map and re-transmit the received bits of that command frame to the second IC 206 as "1001:010:00000" (the bolded numbers indicating the remapping of the received Device Address to an internal Device Address). If the first 4 received bits do not match the USID of the DAT circuit 502 (USID="0001"), then the DAT circuit 502 will commence a process to abort the command being re-transmitted to both internal devices. If the received Device Address matches the USID of the DAT circuit 502, mapping and re-transmission by the DAT circuit 502 continues to both internal devices until the DAT circuit 502 can definitively determine that a particular internal device is not the intended target of the entire command frame, or is the intended target of the entire command frame. In the first example in TABLE 3, at the $9^{th}$ bit of the command frame (i.e., the second bit of the Register Address, a "0"), the DAT circuit 502 can determine that the command frame is not intended for the second IC 206 (since its single register is mapped to a Register Address of "01111"), and thus commence a process to abort the command to the DAT circuit 502 second IC 206, as indicated in the "DAT mapping" column. Similarly, if the command frame was "0001:010:01111", as in the second example in TABLE 3, the DAT circuit 502 will commence a process to abort the command to the first IC 202 at the $9^{th}$ bit of the command frame (i.e., the second bit of the Register Address, a "1"), since the first IC 202 has no register with an address starting with a "1" in this example.

The third example in TABLE 3 shows that the DAT circuit 502 commences a process to abort the command to both the first IC 202 and the second IC 206 once a determination is made by the DAT circuit 502 (USID="0001") that it is not being addressed (some other IC, device #3 having a USID of binary "0011", is instead being addressed by the master device).

The fourth example in TABLE 3 shows that the DAT circuit 502 commences a process to abort the command (e.g., by setting a flag) (1) first for the first IC 202 once a determination is made by the DAT circuit 502 that the register address ("01000") in the received command frame cannot be mapped to the single register (address="00000") of the first IC 202, and (2) next for the second IC 206 once a determination is made by the DAT circuit 502 that the register address in the received command frame ("01000") cannot be mapped to the single register (address="01111") of the second IC 206. As this example demonstrates, commencing a process to abort a command may occur at different points in the dynamic address translation process.

The fifth example in TABLE 3 shows the broadcast case, where Device Address "0000" is a broadcast command to which all devices must respond. In this case, the Register Address portion of the received command frame is passed on to both the first IC 202 and the second IC 206 with no translation by the DAT circuit 502.

The sixth example in TABLE 3 assumes that all slave devices (primary and secondary) each have a register with a shared Register Address. Thus, in this example, the first IC 202 (USID="1000") and the second IC 206 (USID="1001") each have an additional register with an address of "00100". In this case, Device Address mapping occurs (i.e., the received command frame is passed to both devices), but not Register Address mapping (i.e., both first IC 202 and the second IC 206 receive the same Write command). This mode of partial address translation is useful for some types of operations, such as trigger commands. For example, trigger commands may be used if multiple registers in the same device, or in multiple devices, are required to be loaded at exactly the same time or if the timing of the system requires multiple registers to be loaded, or specific actions to take place, within a timing-critical window of time.

Accordingly, the above examples illustrate three of the possible uses for Register Address mapping: (1) Register Address mapping takes place; (2) Register Address Mapping starts to take place, but is aborted; and (3) Register Address mapping does not take place.

DAT Embodiment—Connections to Internal ICs

Figure 6A:
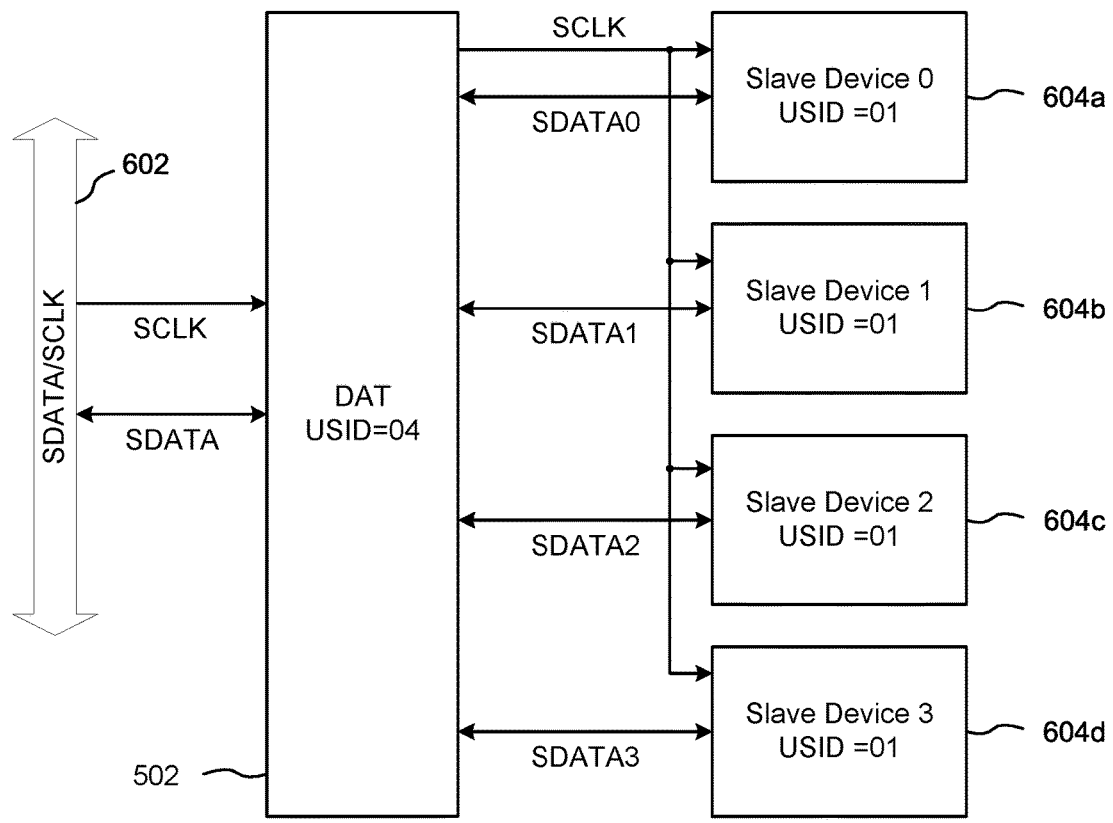
FIG. 6A is a block diagram of a stand-alone dynamic address translation (DAT) circuit coupled to multiple slave devices through dedicated serial signal lines.

Referring again to FIG. 5, for some serial bus standards (particularly non-real time serial buses), the connection of a DAT circuit 502 to internal slave devices may be through dedicated serial signal lines, as shown in FIG. 5, or alternatively through shared serial signal lines. As an further example of dedicated serial signal lines, FIG. 6A is a block diagram of a stand-alone dynamic address translation (DAT) circuit 502 coupled to multiple slave devices 604a-604d through corresponding individual serial signal lines (the enclosing module has been omitted for clarity). Clock and data signals SCLK, SDATA from a system-wide control/status serial bus 602 are coupled to the DAT circuit 502. The clock signal SCLK is passed through to the slave devices 604a-604d. Each slave device 604a-604d also receives signals on a corresponding dedicated serial signal line, SDATA0-SDATA3.

Each slave device 604a-604d in FIG. 6A has a USID. The DAT circuit 502 also has its own USID (unique with respect to the control/status serial bus 602), which may be different than the USID's of any of the slave devices 604a-604d, or match the USID on one of the slave devices 604a-604d. The DAT circuit 502 can be configured to enable or disable its individual serial bus connections SDATA0-SDATA3. So long as a combination of Device Address and Register Address from the master device uniquely defines the registers of each slave device 604a-604d, the combined Device Address/Register Address mapping going to the corresponding slave devices 604a-604d on each serial data line SDATA0-SDATA3 can be kept separated by enabling or disabling respective serial buses, and the architecture shown in FIG. 6A allows use of identical (down to the USID) ICs more than once in a multi-die module. An example would be using the same switch IC for transmit and receive paths in a multi-die module.

As an example of operation, each of the slave devices 604a-604d may be assigned an internal Device Address of "0001". Using the combined Device Address and Register Address from the master device and control over the operational state of the respective dedicated serial data lines SDATA0-SDATA3, the DAT circuit 502 can map and transmit a command only to the appropriate slave device 604a-604d. The configuration shown in FIG. 6A is particularly well suited for use with a DAT circuit 502 operating in a real-time mode.

Figure 6B:
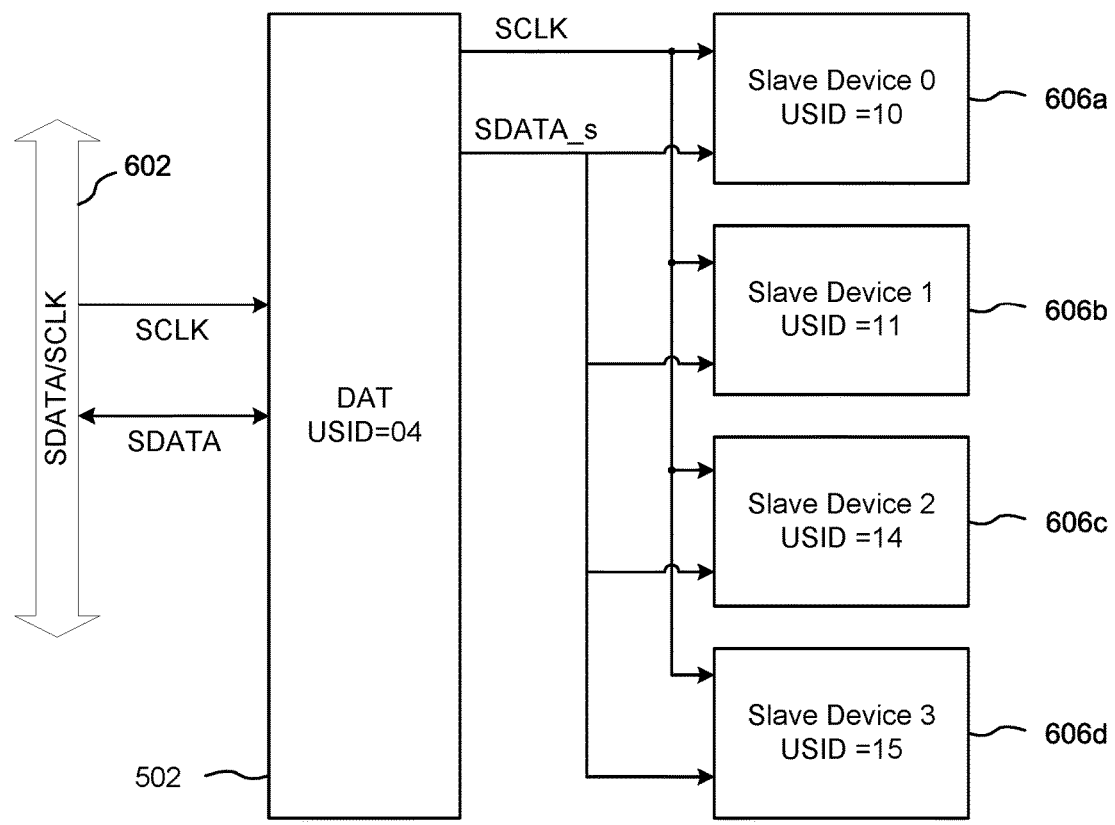
FIG. 6B is a block diagram of a stand-alone dynamic address translation (DAT) circuit coupled to multiple slave devices through shared serial signal lines.

As an example of shared serial signal lines, FIG. 6B is a block diagram of a stand-alone dynamic address translation (DAT) circuit 502 coupled to multiple slave devices 606a-606d through shared serial signal lines (the enclosing module has been omitted for clarity). Clock and data signals SCLK, SDATA from a system-wide control/status serial bus 602 are coupled to the DAT circuit 502. The clock signal SCLK is passed through to the slave devices 606a-606d. Each slave device 606a-606d also receives signals on a shared serial signal line, SDATA_s. In this configuration, each slave device 606a-606d should have a unique USID (e.g., decimal "10", "11", "14", "15"), and "listen" for its Device Address on the shared serial signal line, SDATA_s. In the alternative, each slave device 606a-606d must be configured with registers that are uniquely addressable. Device Address and Register Address signals provided by the master device through the SDATA signal line of the control/status serial bus 602 are mapped by the DAT circuit 502 to the Device Address of one of the slave device 606a-606d. Accordingly, each slave device 606a-606d operates in a conventional fashion, responding to a mapped Device Address matching its USID, while the DAT circuit 502 presents only a single USID to a master device coupled to the control/status serial bus 602.

As should be clear, it is possible to combine the architectures shown in FIG. 6A and FIG. 6B, such that the DAT circuit 502 is coupled to some slave devices through dedicated serial signal lines, as in FIG. 6A, while being coupled to other slave devices through shared serial signal lines, as in FIG. 6B, so long as the registers in the slave devices are uniquely addressable.

Methods

Figure 7:
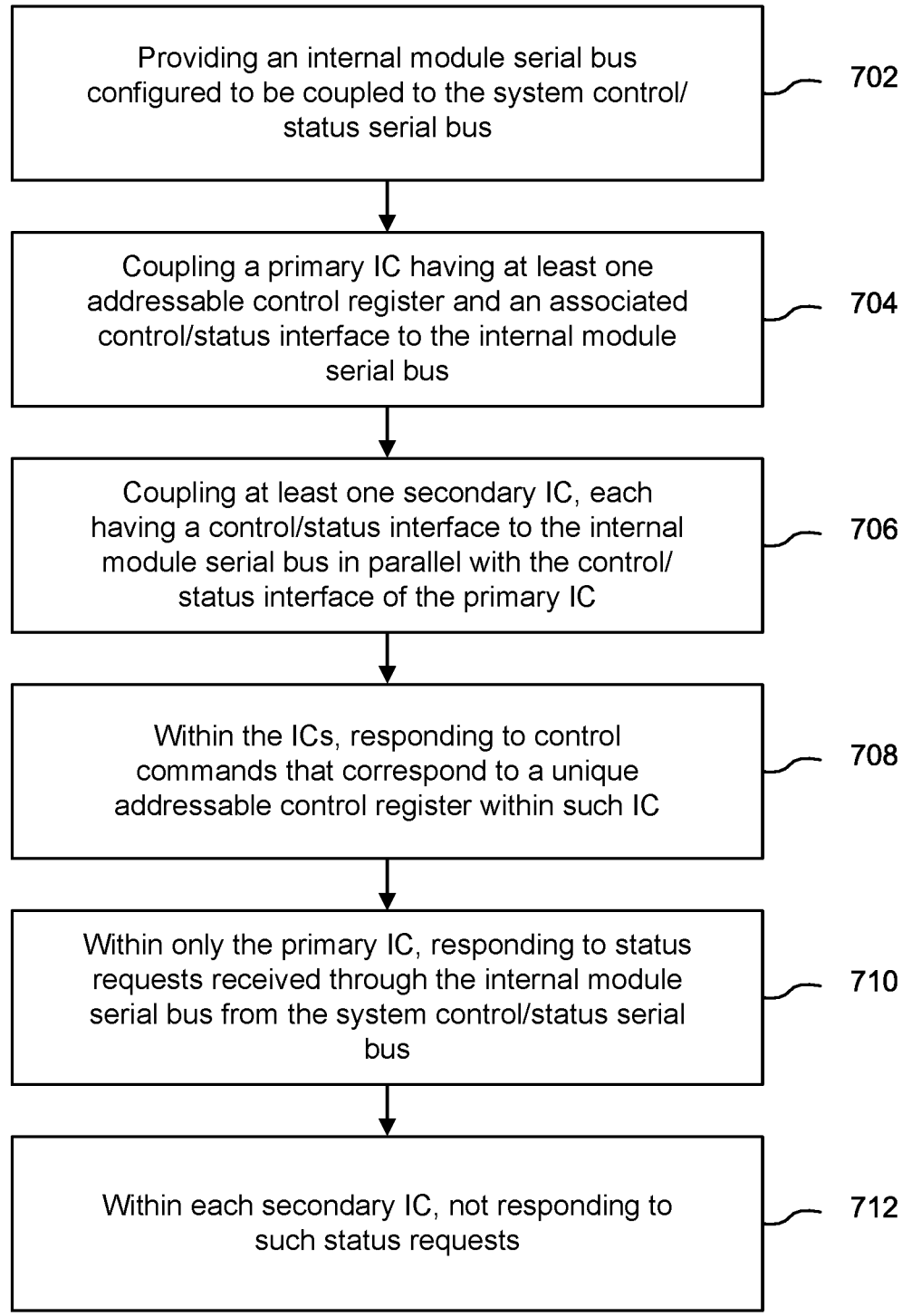
FIG. 7 is a process chart showing a method for connecting C/S interfaces of multiple ICs in parallel within a multi-IC module.

Another aspect of the invention includes methods for connecting a circuit module in a housing for a plurality of integrated circuits (ICs) while presenting a single unique address to a system control/status serial bus. For example, FIG. 7 is a process chart showing a method 700 for connecting C/S interfaces of multiple ICs in parallel within a multi-IC module. This method may include: providing an internal module serial bus configured to be coupled to the system control/status serial bus (STEP 702); coupling a primary IC having at least one addressable control register and an associated control/status interface to the internal module serial bus (STEP 704); coupling at least one secondary IC, each having at least one addressable control register and an associated control/status interface to the internal module serial bus in parallel with the control/status interface associated with the primary IC (STEP 706); within the primary IC and each secondary IC, responding to control commands received through the internal module serial bus from the system control/status serial bus that correspond to a unique addressable control register within such primary IC or secondary IC (STEP 708); within only the primary IC, responding to status requests received through the internal module serial bus from the system control/status serial bus (STEP 710); and within each secondary IC, not responding to such status requests (STEP 712).

This method may also encompass the primary IC including a set of duplicate addressable control registers corresponding to addressable control registers in at least one secondary IC, and further include, within the primary IC, responding to status requests received through the internal module serial bus from the system control/status serial bus and directed to an addressable control register of such at least one secondary IC.

Figure 8:
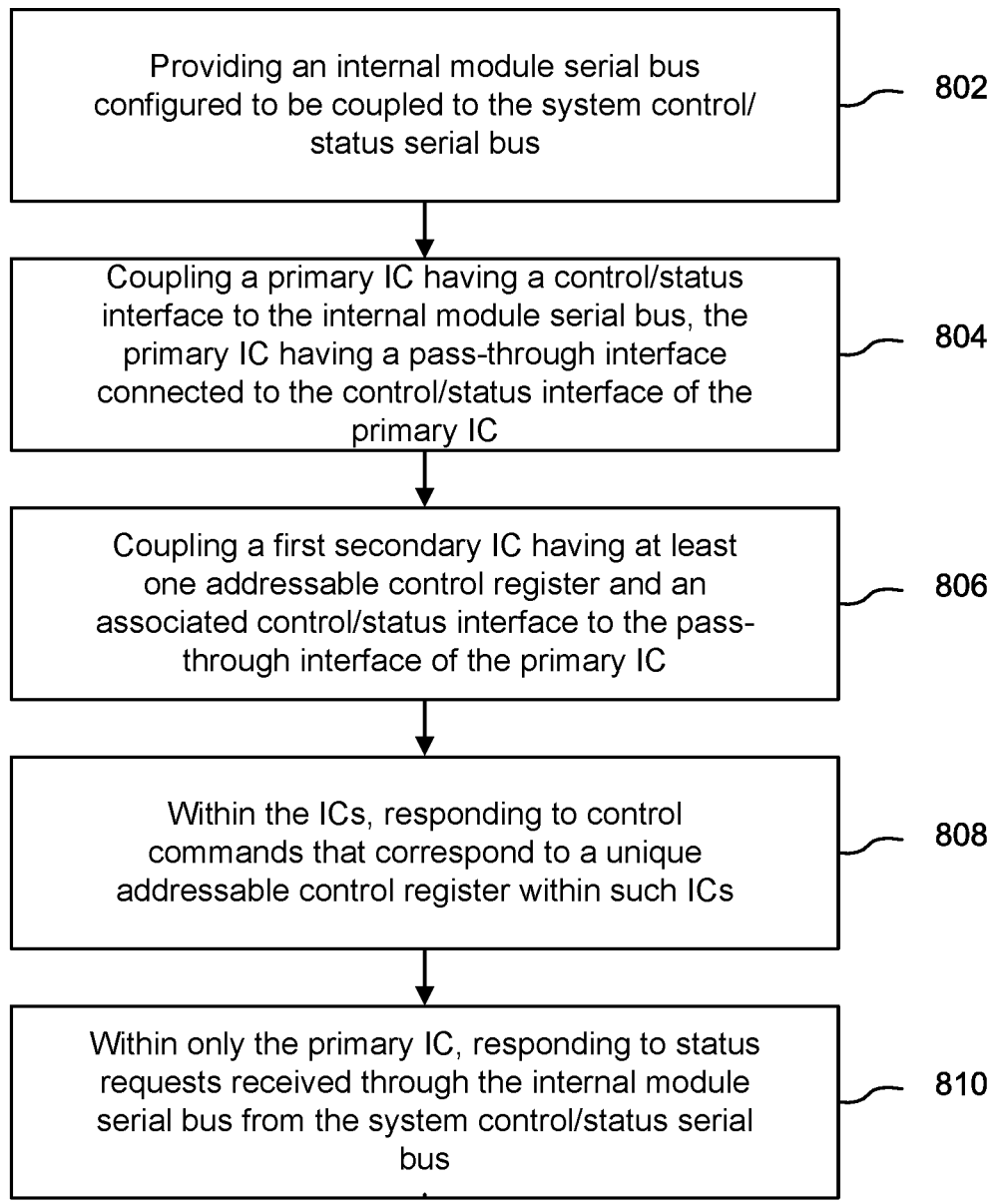
FIG. 8 is a process chart showing a method for connecting C/S interfaces of multiple ICs in series within a multi-IC module.

As another example, FIG. 8 is a process chart showing a method 800 for connecting C/S interfaces of multiple ICs in series within a multi-IC module. This method may include: providing an internal module serial bus configured to be coupled to the system control/status serial bus (STEP 802); coupling a primary IC having at least one addressable control register and an associated control/status interface to the internal module serial bus, the primary IC having a pass-through interface coupled to the associated control/status interface of the primary IC (STEP 804); coupling a first secondary IC having at least one addressable control register and an associated control/status interface to the pass-through interface of the primary IC (STEP 806); within the primary IC and the secondary IC, responding to control commands received through the internal module serial bus from the system control/status serial bus that correspond to a unique addressable control register within such primary IC or secondary IC (STEP 808); and within only the primary IC, responding to status requests received through the internal module serial bus from the system control/status serial bus (STEP 810).

This method may also encompass any one or more of the following:

- The primary IC including a set of duplicate addressable control registers corresponding to addressable control registers in the secondary IC, and further include, within the primary IC, responding to status requests received through the internal module serial bus from the system control/status serial bus and directed to an addressable control register of the secondary IC.
- The first secondary IC including an associated pass-through interface coupled to the associated control/status interface of the secondary IC, and further include coupling an associated control/status interface of a second secondary IC having at least one addressable control register to the pass-through interface of the first secondary IC.
- In the primary IC, blocking responses by the first secondary IC to status requests that correspond to a unique addressable control register within the first secondary IC.
- In the first secondary IC, not responding to status requests received from the system control/status serial bus that correspond to a unique addressable control register within the first secondary IC.

Figure 9:
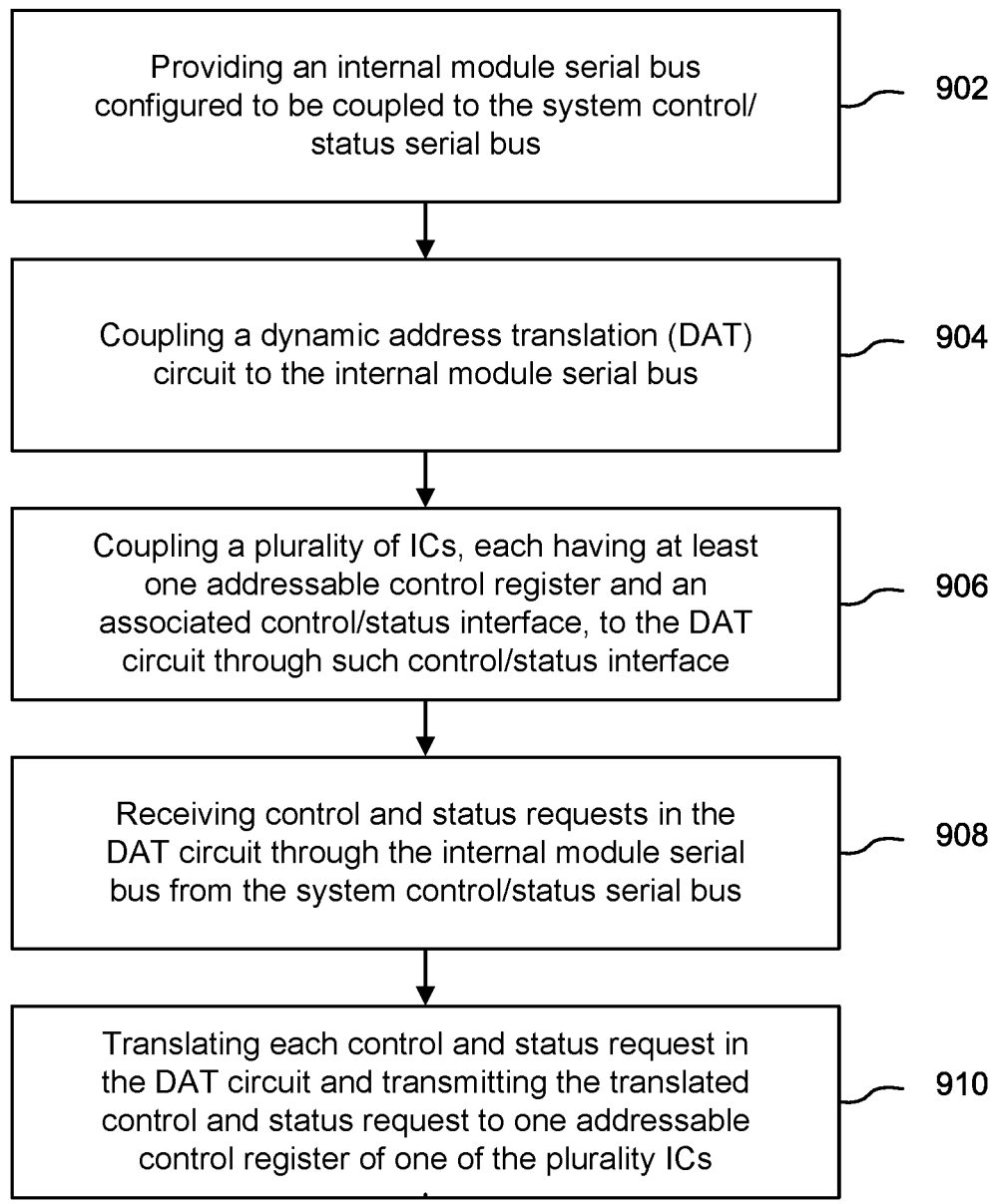
FIG. 9 is a process chart showing a method for connecting C/S interfaces of multiple ICs within a multi-IC module using a dynamic address translation architecture.

As another example, FIG. 9 is a process chart showing a method 900 for connecting C/S interfaces of multiple ICs within a multi-IC module using a dynamic address translation architecture. This method may include: providing an internal module serial bus configured to be coupled to the system control/status serial bus (STEP 902); coupling a dynamic address translation (DAT) circuit to the internal module serial bus (STEP 904); coupling a plurality of ICs, each having at least one addressable control register and an associated control/status interface, to the DAT circuit through such associated control/status interface (STEP 906); receiving control and status requests in the DAT circuit through the internal module serial bus from the system control/status serial bus (STEP 908); and translating each control and status request in the DAT circuit and transmitting the translated control and status request to one addressable control register of one of the plurality ICs (STEP 910).

This method may also encompass any one or more of the following:

- Coupling each slave IC to the DAT circuit through a corresponding dedicated serial signal line.
- Coupling each slave IC to the DAT circuit through a shared serial signal line.
- Receiving each control and status request in the DAT circuit as a command comprising a sequence of bits, transmitting the sequence of bits to at least some of the plurality of ICs until a definitive intended IC is determined by the DAT circuit, and thereafter aborting the command sent to unintended ICs.
- Integrating the DAT circuit internally to one of the plurality of ICs.

Options and Fabrication Technologies

An additional aspect of the invention is that an internally serial C/S embodiment such as is shown in FIG. 4, or a dynamic address translation C/S embodiment such as is shown in FIG. 5, may also do format translation. For example, if the serial data protocol on the C/S serial bus 304 is some form of the MIPI RFFE standard, the output of the PT interface of the first IC 202 in FIG. 4, or the protocol on the internal C/S serial bus coupled to the DAT circuit 502, may be one or more other serial formats (e.g., for the DAT circuit 502, some of the SDATAx signal lines in FIG. 6A may be MIPI and some SPI, or all may be SPI). This would allow inclusion of ICs within a multi-IC module that do not natively communicate over the C/S serial bus 304. Techniques and circuits for such format translation are well known in the industry, but their application in the context of the present invention would be unique.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET and IGFET structures), or in hybrid or discrete circuit forms. Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation (in excess of about 10 GHz, and particularly above about 20 GHz). Monolithic IC implementation is particularly useful since parasitic capacitances generally can be kept low (or at a minimum, kept uniform across all units, permitting them to be compensated) by careful design.

The term "MOSFET" technically refers to metal-oxide-semiconductors; another synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductors, but instead includes IGFETs in general.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A circuit module for housing a plurality of integrated circuits (ICs) while presenting a single unique address to a system control/status serial bus, including:
   (a) an internal module serial bus configured to be coupled to the system control/status serial bus;
   (b) a primary IC having at least one addressable control register and a control/status interface coupled to the internal module serial bus; and
   (c) at least one secondary IC, each having at least one addressable control register and a control/status interface coupled to the internal module serial bus in parallel with the control/status interface of the primary IC;
   wherein the primary IC and each secondary IC respond to control commands received through the internal module serial bus from the system control/status serial bus that correspond to a unique addressable control register within the primary IC or the secondary IC, and wherein only the primary IC responds to status requests received through the internal module serial bus from the system control/status serial bus, and each secondary IC is configured to not respond to status requests.

2. The invention of claim 1, wherein the primary IC includes a set of duplicate addressable control registers corresponding to addressable control registers in at least one secondary IC, and wherein the primary IC responds to status requests received through the internal module serial bus from the system control/status serial bus and directed to an addressable control register of at least one secondary IC.

3. A method for connecting a circuit module in a housing for a plurality of integrated circuits (ICs) while presenting a single unique address to a system control/status serial bus, including:
   (a) providing an internal module serial bus configured to be coupled to the system control/status serial bus;
   (b) coupling a primary IC having at least one addressable control register and a control/status interface to the internal module serial bus;
   (c) coupling at least one secondary IC, each having at least one addressable control register and a control/status interface to the internal module serial bus in parallel with the control/status interface of the primary IC;
   (d) within the primary IC and each secondary IC, responding to control commands received through the internal module serial bus from the system control/status serial bus that correspond to a unique addressable control register within the primary IC or the secondary IC;
   (e) within only the primary IC, responding to status requests received through the internal module serial bus from the system control/status serial bus; and (f) within each secondary IC, not responding to status requests.

4. The method of claim 3, wherein the primary IC includes a set of duplicate addressable control registers corresponding to addressable control registers in at least one secondary IC, and further including, within the primary IC, responding to status requests received through the internal module serial bus from the system control/status serial bus and directed to an addressable control register of at least one secondary IC.

* * * * *